Aug. 19, 1952     G. C. SEAVEY ET AL     2,607,568
ROLLER TYPE SONIC GENERATOR
Filed Aug. 16, 1950     5 Sheets-Sheet 1
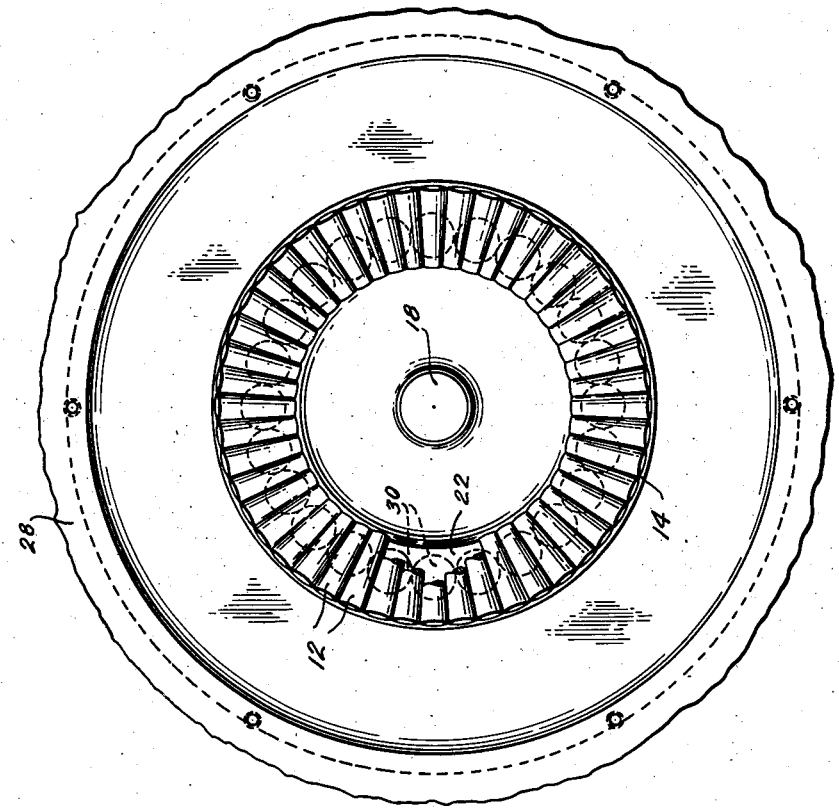
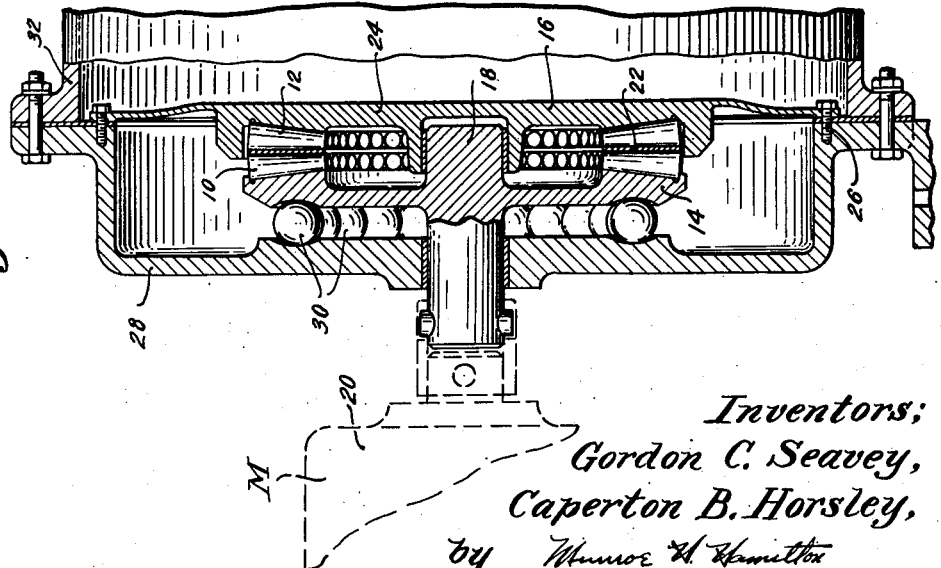
Inventors;
Gordon C. Seavey,
Caperton B. Horsley,
by Munroe H. Hamilton
Att'y.

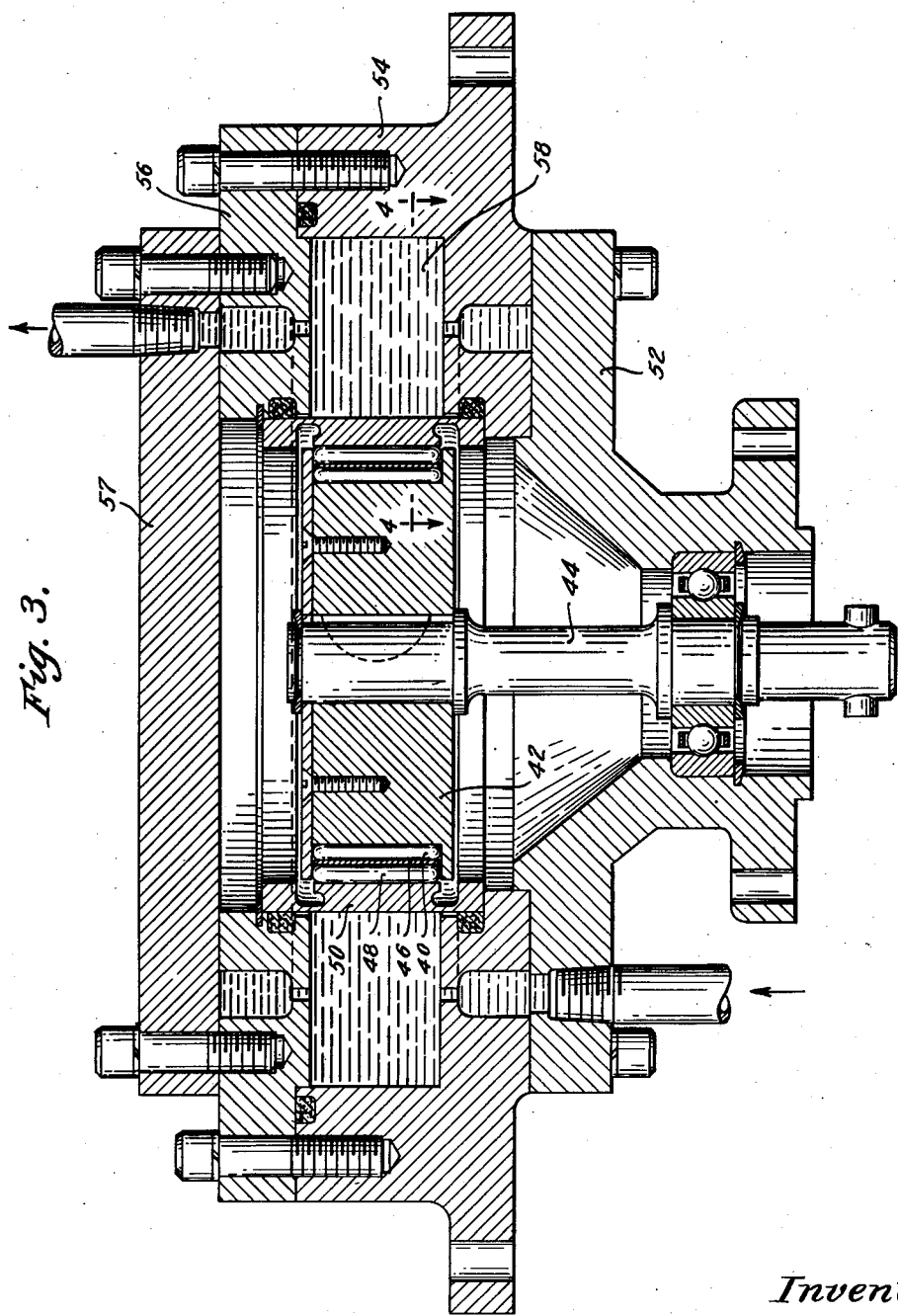

Aug. 19, 1952 G. C. SEAVEY ET AL 2,607,568
ROLLER TYPE SONIC GENERATOR
Filed Aug. 16, 1950 5 Sheets-Sheet 3
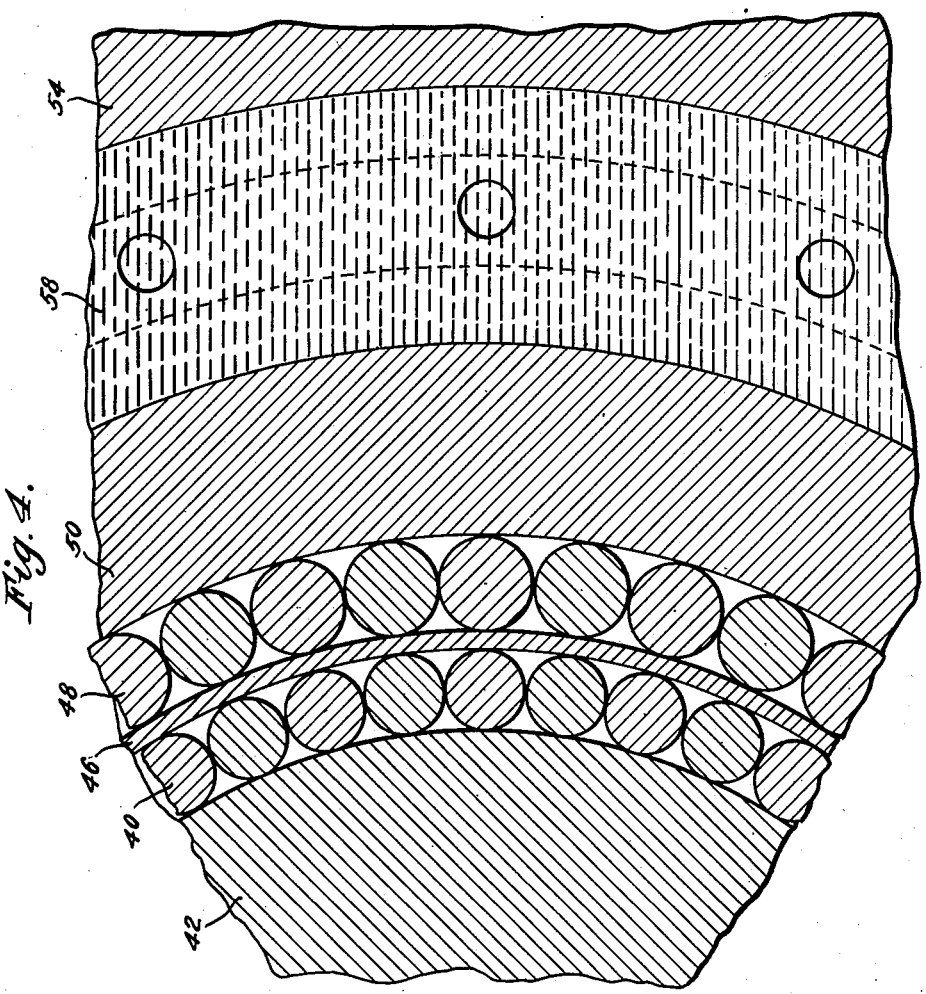
Inventors;
Gordon C. Seavey,
Caperton B. Horsley,
by Munroe H. Hamilton
Att'y.

Aug. 19, 1952  G. C. SEAVEY ET AL  2,607,568
ROLLER TYPE SONIC GENERATOR
Filed Aug. 16, 1950  5 Sheets-Sheet 4
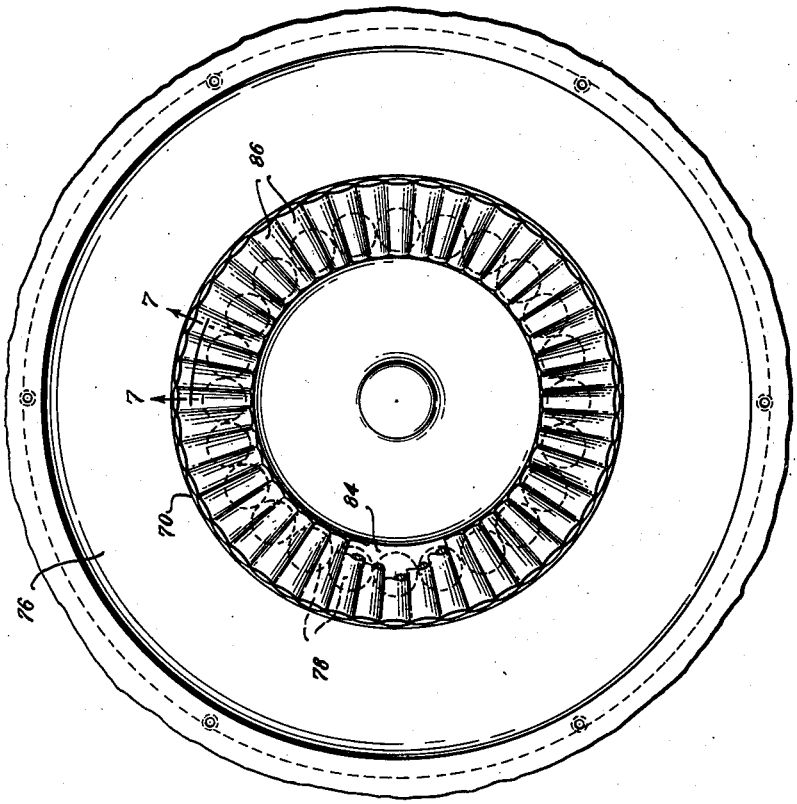
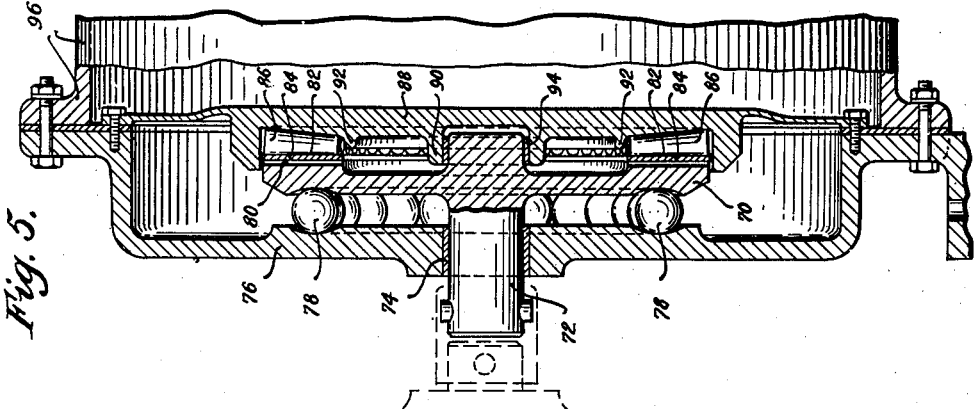
Inventors.
Gordon C. Seavey,
Caperton B. Horsley,
by W. R. Hulbert
Att'y Aug. 19, 1952　　　G. C. SEAVEY ET AL　　　2,607,568
ROLLER TYPE SONIC GENERATOR
Filed Aug. 16, 1950　　　　　　　　　　　　5 Sheets-Sheet 5
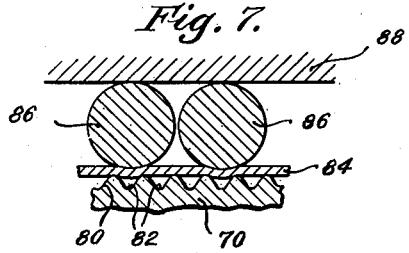
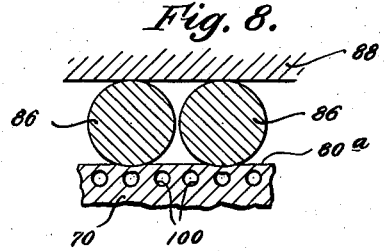
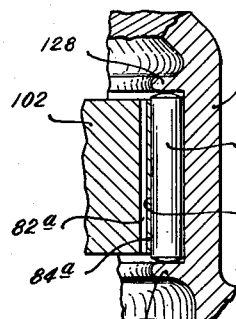
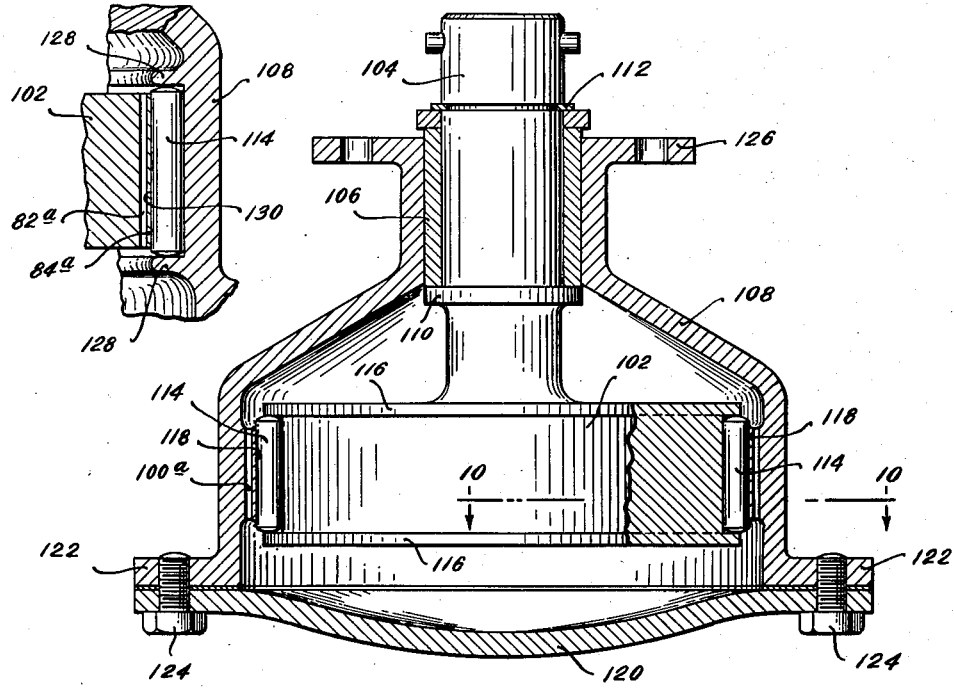
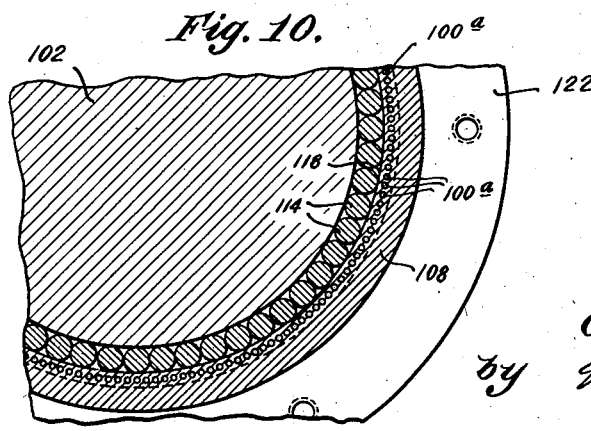
Inventors,
Gordon C. Seavey,
Caperton B. Horsley,
by W. R. Hulbert
Atty Patented Aug. 19, 1952

2,607,568

UNITED STATES PATENT OFFICE 2,607,568

ROLLER TYPE SONIC GENERATOR

Gordon C. Seavey, Arlington, and Caperton B. Horsley, Boston, Mass., assignors to Sonic Research Corporation, Boston, Mass., a corporation of Massachusetts Application August 16, 1950, Serial No. 179,711

19 Claims. (Cl. 259—1)

This invention relates to improvements in sound generating equipment. More particularly it is concerned with a new and improved generator for producing entirely by mechanical means sound waves of great intensity and at a frequency which may be varied over a wide range, including very high frequencies.

This is a continuation-in-part of our abandoned application, Serial No. 123,112, filed October 24, 1949.

Sound waves both within and above the audible range are known to be useful in affecting the characteristics of various materials and such effects have frequently been demonstrated experimentally. Thus certain chemical reactions have been accelerated under the influence of sonic irradiation, various emulsions of normally immiscible substances have been prepared, the rate of bacterial growth in fluid cultures has been materially affected, particles in fluid suspensions have been coagulated, and many other applications have been found. Furthermore, sound waves are useful in the analysis of the inner structure of bodies by reflection techniques; it may be extended to so-called seismic prospecting for underground deposits of oil or other minerals.

While these various phenomena have been known for some time, generally speaking, there has been little or no development on a commercial scale because of the inherent limitations in the sound producing equipment hitherto available. Prior attempts to generate vibratory forces for the purposes outlined above have been confined for the most part to the use of piezoelectric or magnetostrictive equipment. Such devices are limited in their available power by the tendency of the vibrating elements to fracture at high sound pressure levels, and by the relatively low efficiency of conversion of electrical into acoustical power.

The principal object of the present invention is to provide a device for producing sound waves entirely by mechanical means which is capable of producing high acoustic output at good efficiency and which is at the same time rugged and economical in its construction and operation.

Another object of the invention is to provide sound generating equipment for the sonic treatment of various materials, the equipment being capable of handling relatively large amounts of such materials in an efficient manner.

Still another object of the invention is to provide a sonic generator capable of delivering great acoustic power throughout a considerable range of frequencies.

According to the invention we provide a roller bearing assembly for producing the desired vibrations. A row of uniform approximately equally spaced rollers is compressively maintained between rotating and non-rotating roller race members. One of said races is constituted in such a way as to present a surface of periodically varying resiliency to the rollers, so that, due to the compressive force exerted on the rollers, as the rollers pass alternately from areas of high resistance to a lower resistance, the two races will approach and recede from one another at a frequency dependent upon the size and number of the rollers, the spacing of the areas of different resiliencies, and the speed of rotation. The vibrations thus produced may be transmitted to the material or body undergoing treatment or investigation.

We have found that a suitable race forming such a surface of varying resiliency for the rotating rollers may conveniently be provided in a number of ways. In one form of the invention one race constitutes another row of rollers separated from the first row by a thin resilient shim. The moving rollers compressively engage the shim surface and, during operation, the rollers of one set will move alternately into and out of alignment with corresponding rollers of the other set. During intervals when the rollers are out of alignment the intermediate race flexes slightly, then recovers when the rollers become realigned; the races are thus caused to approach and recede from one another periodically.

In another form of the invention the roller engaging surface of varying resiliency is formed by providing a series of grooves in one of the races superimposed on which is a thin resilient shim. As the moving rollers pass opposite the grooves the shim will flex slightly, recovering when the rollers pass opposite the intervals between the grooves. Vibrations are produced as before.

In still another form of the invention in place of the grooves and shim, as just described, we may periodically weaken one of the races by providing just beneath the roller engaging surface thereof a series of uniform cavities. As the rollers move, under compression, along the surface, the resilient material composing the race will yield to a greater extent when the rollers are opposite the cavities than when they are between the cavities. Here again the vibrations are produced by the periodic motion toward and away from each other of the roller races.

The roller assembly of the invention may be disposed in a variety of different ways depending upon the nature and direction of the desired vibrations. Thus the rollers, which may be cylindrical or tapered, may be disposed as an annular series having their axes radially directed and the series being held compressively between two disc-shaped members, one of which is arranged to rotate. On the other hand, it may be found convenient to dispose the rollers in a circle about a disc-shaped member, the axes of the rollers being parallel to the axis of the disc and rolling on the outer surface thereof and engaged by a concentric outer race. In this case the acoustic energy is generated in a radial fashion.

Further objects, advantages and features of the invention will become apparent from the following detailed description of preferred embodiments thereof taken in connection with the accompanying drawings in which like numerals refer to like parts in the several views and in which:

Fig. 1 is a fragmentary cross-sectional view of one form of sound generating mechanism of the invention including a dual roller assembly;

Fig. 2 is a plan view of the structure shown in Fig. 1 with the upper oscillating section having been removed therefrom to disclose the upper row of rollers;

Fig. 3 is a vertical cross-sectional view of another form of generator according to the invention, further illustrating a different arrangement for a dual roller assembly;

Fig. 4 is a detail plan cross-section on line 4—4 of Fig. 3 fragmentarily indicating a section of the roller structure and retaining races;

Fig. 5 is a cross-sectional view similar to Fig. 1 of a modified form of the invention employing a single row of rollers;

Fig. 6 is a plan view similar to Fig. 2 of the structure shown in Fig. 5;

Fig. 7 is a fragmentary section on line 7—7 of Fig. 6 showing the roller and shim sound generating means of the device shown in Figs. 5 and 6;

Fig. 8 is a fragmentary detail view similar to Fig. 7 of a modified roller assembly which may be substituted for that shown in Fig. 5;

Fig. 9 is a sectional view of still another modification of the invention, resembling that shown in Fig. 3, but in which the sound waves are generated and radiated outwardly in a radial pattern;

Fig. 10 is a fragmentary section taken on line 10—10 of Fig. 9; and

Fig. 11 is a fragmentary sectional view of a modification of the apparatus of Fig. 9 in which the resilient roller engaging surface is provided by employing a series of grooves beneath a resilient shim.

In the assembly shown in Figs. 1 to 4, two rows of approximately equally spaced uniform rollers are compressively maintained between a rotating roller race and a non-rotating roller race. The two rows of rollers are, in addition, separated by means of a thin resilient intermediate race or shim. The number of rollers in one row is equal to, or may be an integral multiple of the number in the other row.

With the arrangement described, operation of the rotating roller race induces movement of the rollers in a manner such that the rollers in one row are constantly moved into and out of alignment, in the direction of the compressive force, with the rollers in the other row. During intervals when the rows are not in alignment, the thin intermediate race deflects under the compressive load, permitting the two races to approach one another, the deflection becoming greater as the rollers depart further from alignment. Thus the two races periodically approach and recede from one another at the frequency of roller alignment. This oscillating motion may be transmitted from the non-rotating race to a surface suitable for radiating sound or vibration, or the race itself may constitute all or a portion of the radiating surface.

Thus in Figs. 1 and 2, a multiple roller arrangement is illustrated, consisting of a lower row of rollers 10, an upper row of rollers 12, equal in number to those in the lower row, and a thin resilient intermediate shim 22. This assembly is held compressively between the rotating race 14 and the non-rotating race 24. This upper race 24 has a relatively thin circumferential flange extension which upon assembly is deformed and forced into contact with the housing 28 by retaining bolts 26, thereby applying compressive force to the roller assembly which is prevented from axial movement under this force by ball bearings 30, located between the inner face of race 14 and the housing 28.

Secured adjacent and in spaced relation to the roller race 24 is a closure 32 arranged to provide a treating chamber for holding fluid bodies in contact with the outer face of the non-rotating race 24 which constitutes the radiating surface. In some instances it may be desired to employ the multiple roller assembly without a closed chamber such as is formed by the member 32, in which case the surface of the non-rotating race member 24 is brought directly into contact with the material or body which is to receive the sound or vibration. In other instances, the oscillations of the non-rotating race may not act directly on the material to be subjected to sound or vibration, but may be transmitted through a suitable mechanism to actuate either a radiating or material treating surface, or a resonant system of which the radiating or material treating surface is a portion.

In the operation of the device described, the motor 20 turns the shaft 18 and the lower race 14, thus causing rolling movement of the lower set of rollers 10 between the race 14 and the intermediate shim 22. Since relative movement between the rows of rollers takes place, each roller of one row alternately moves into and out of axial alignment with an adjacent roller of the opposite row. Since the rollers are under compression by reason of the construction described, the mechanism expands and contracts axially during the period when the rollers move from a position of axial alignment to a position of non-alignment and back into alignment again; and a displacement occurs in the non-rotating race member 24, producing sound waves directed outwardly into the treating chamber or into any other body in contact with the member 24.

An alternate arrangement of multiple rollers has been illustrated in Figs. 3 and 4, in which an inner row of rollers 40 is arranged coaxially around to bear against an inner cylindrical race member 42 fixed to a shaft 44. The shaft is adapted to be rotated by some suitable means such as an electric motor (not shown). An intermediate resilient race 46 surrounds the rollers 40. Also bearing against the intermediate shim 46 is an outer row of rollers 48 which lie in contact with a cylindrical outer race 50 which is so dimensioned that its bore, in the unstressed condition, is slightly smaller than the outside diameter of the outer row of rollers 48. Thus when the outer row is assembled by shrinking over rollers 48, it is in a state of tension and exerts a compressive force against the inner elements of the assembly. In this case the outer surface of race 50 constitutes the surface for radiating sound.

The shaft 44 is supported in a housing which includes a bottom section 52, an intermediate body portion 54, and cover sections 56 and 57. The intermediate portion 54 is recessed to form a liquid containing treating chamber 58, one side of which communicates with the outer race 50 as noted above.

In operation, the material to be treated is introduced into the chamber 58 and the shaft is rotated, causing the two sets of rollers to move into and out of radial alignment, thus causing the outer race 50 to expand and contract periodically. The waves generated by the oscillations of the outer race in this case pass radially outwardly into the container chamber 58.

Another form of the invention is shown in Figs. 5 to 7, where there is disclosed a rotating race member 70 with a shaft extension 72 which rotates in a sleeve bearing 74 in housing 76. A row of ball bearings 78 permits the rotating race member 70 to rotate in spaced relation to the housing 76.

As best seen in Fig. 7, the annular surface of the rotating race member 70 is interrupted by a series of radial grooves 82, regularly spaced around the surface 80. Resting on this interrupted annular surface 80 is a thin resilient shim 84, on which there is located a row of tapered rollers 86. This assembly is held compressively against the rotating race member 70 by the stationary race member 88, which also serves to locate the shim 84 and rollers 86 radially, by means of annular ribs 90 and 92.

The stationary race member 88 has a relatively thin circumferential flange portion which is deformed upon assembly, and secured against the housing 76 by conventional means. The rotating race member 70 is restrained from axial movement toward housing 76 by ball bearings 78. The fixed race member 88 is recessed to receive the upper end of the drive shaft 72, which slides in a sleeve bearing 94.

Secured to the housing 76 is a container 96 which may serve to hold fluid bodies in contact with the outer surface of the race member 88, from which sound is radiated. A motor 98 is coupled to the shaft extension 72, and supplies motive power to the rotating race member 70.

In operation, as the rotating race member 70 is driven by the motor 98, the tapered rollers 86 are caused to roll along the resilient annular shim 84. Whenever the lines of contact of the rollers are opposite the radial grooves 82, the shim will deflect slightly, as shown more clearly in the enlarged detail of Fig. 7. The fixed race member 88, which is compressively held against the rollers 86, is thereby caused to approach and recede from the rotating race 70 at a frequency determined by the speed of rotation of the rotating race 70, the spacing of the grooves 82, and the number and size of the rollers 86. The outer surface of the fixed race member 88 then radiates these oscillations into the fluid body in the container 96.

Alternatively, the container 96 may be dispensed with and the radiating surface of race member 88 may be brought directly into contact with the body to be affected. Such a procedure would be useful, for example, in directing the radiated sound into the interior of the earth, as in seismic prospecting.

The arrangement of elements shown in detail in Fig. 7 is such that, in effect, the roller engaging surface of the shim 84 constitutes a surface of periodically varying resiliency. The surface is more easily deflected when the rollers 86 are directly opposite the grooves 82 than when they are opposite the peaks of surface 80. As the rollers 86 travel over the surface of varying resiliency presented by the shim 84, they are caused to oscillate, while so travelling, in a direction parallel to the main axis of the mechanism, that is, the axis of the drive shaft 72. The frequency of this oscillation, which is transmitted to the radiating surface of the race 88, may be changed by varying the speed of rotation of the race 70, or the spacing of the grooves 82. The amplitude of the oscillations may be altered by changing the cross-sectional shape of the grooves 82; for example, if the peaks of the surface 80 were pointed, instead of rounded as in Fig. 7, the deflections of the shim 84 would be slightly greater.

It will be noted that the spacing of elements shown in Fig. 7 is such that in the distance between centers of adjacent rollers 86, there occur four of the radial grooves 82 in the interrupted surface 80 of race member 70. This obviously results in a generated sound frequency which is four times that which would result from a spacing between grooves equal to the spacing of roller centers, as would be the case if the shim 84 were resting on a second row of similar rollers, for example, as in the embodiments of Figs. 1 to 4. The spacing of the grooves may, of course, be changed to give any desirable frequency multiplication without departing from the spirit of the invention.

It should be pointed out here that one advantage of this type of construction including the resilient shim lies in the fact that the rollers travel over a continuous surface, rather than an interrupted surface which is prone to wear. This and other forms of a surface of periodically varying resiliency of our invention are in keeping with our object to provide equipment which is relatively simple and economical in its construction.

An alternative arrangement for forming a surface of periodically varying resiliency is shown in the detailed view, Fig. 8, where the rollers 86 are compressively maintained against the surface 80a of the rotating race member 70, and there is no thin shim. A regularly spaced series of cavities 100 lies closely under the surface 80a, and as the points of contact of the rollers pass above the holes 100, the surface deflects slightly as the holes distort. Thus the surface 80a presents periodically varying resilience as the rollers travel on it, and oscillatory motion is imparted by the rollers to the race member 88 as before.

Although the cavities 100 as illustrated in Fig. 8 are circular in cross-section, the invention is not limited in scope to this type of construction. It may be desirable to employ holes of non-circular cross-section in order to bring about deflections of a particular type which would result in the production of harmonics in the generated sound waves.

Any of the arrangements just described may be used in the sound generating device of Figs. 5 and 6, or, alternatively, these arrangements may be used in a sound generator of the type shown in Figs. 9 and 10 having a row of rollers disposed to roll on the periphery of a circular race member and having their axes parallel to the axis of the drive shaft.

In the generator of Fig. 9, which may, for example, be immersed in an extended fluid body, a rotating circular race member 102 is carried on shaft 104, which turns in a sleeve bearing 106 located in the housing 108. The shaft is restrained from endwise motion by a shoulder 110 and a lock washer 112 on the shaft.

Disposed about the periphery of the rotating race 102 is a row of cylindrical rollers 114 held in place by flanges 116 on the race 102. This assembly is compressively maintained inside the cylindrical bearing surface 118, as more clearly shown in the cross-sectional view, Fig. 10, taken along the line 10—10 of Fig. 9.

The housing 108 is closed at its bottom end with a cover 120 attached to a flange 122 with bolts 124. The shaft 104 may be driven in any suitable manner, as by an electric motor. The generator may be mounted on any suitable framework by attachment to the upper flange 126.

In operation of this embodiment of our invention, as the rotating race member 102 rotates, the row of rollers 114 is caused to roll over the bearing surface 118, which is a surface having periodically varying resiliency along its extent. The outer surface of the housing 108 is thus caused to expand and contract radially as the device operates, and sound waves are radiated in a radial pattern into the surroundings, which may be a fluid in which the unit is immersed.

Fig. 10 illustrates the details of construction of the assembly of rollers and bearing surface in the device of Fig. 9 and corresponds to the embodiment of Fig. 8 showing one type of bearing surface of periodically varying resiliency as used in connection with the generator of Figs. 5 and 6. The outer race 108 is provided with a series of cavities 100a just beneath its roller contacting surface 118. As previously explained in connection with Fig. 8, the openings 100a weaken the roller engaging surface periodically, thus creating a surface of periodically varying resiliency for producing radially directed vibrations with movement of the rollers over such surface.

Alternatively, in this embodiment, the rollers 114 may travel on the inner surface of housing 108, as shown in Fig. 11, being restrained by ribs 128 and the bearing surface 130, of periodically varying resiliency, may be formed on the rotating race member 102. In such a case, the periphery of the rotating race member 102 would be formed as a surface of periodically varying resiliency in accordance with either of the schemes illustrated by Figs. 7 and 8, for example. As shown it has a shim 84a shrunk over a series of parallel peripheral grooves 82a.

From the foregoing discussion it should be evident that in the various forms of the invention herein shown, either race member may be rotated and the other held stationary, and that the surface of periodically varying resiliency likewise may be formed on the surface of either the rotating or stationary race. Likewise, the generator of the invention may be so proportioned and employed with treating chambers which are so dimensioned as to take advantage of vibratory resonant effects.

The embodiments illustrated in the accompanying drawings have been designed to be relatively simple and economical of construction, and capable of rugged use in practical industrial applications. Changes in the details of construction of the generators, to make them more suitable for specific applications, may occur to those skilled in the art, and may be resorted to without departing from the spirit of the invention.

Having thus described our invention, what we claim and desire to secure by Letters Patent is:

1. In a sonic generator a roller bearing assembly for producing vibrations, which comprises a pair of spaced coaxial members so mounted that one is rotatable relative to the other, said members having portions providing mutually facing plain bearing surfaces which define a circular path therebetween, at least one of said portions being composed at least in part of a layer of resilient material a surface of which constitutes one of said bearing surfaces, a row of regularly spaced rollers held between said members in said path for rolling on said surfaces actuated by the relative movement of said members, means for yieldingly pressing at least one of said members toward the other member for exerting pressure on said rollers between said surfaces and at least one of said members being mounted in said assembly so as to have at least portions thereof movable toward and away from the other member, and means providing a series of supports immediately adjacent said layer opposite its bearing surface for inflexibly supporting the same only at regularly spaced intervals so that the unsupported portions of said layer will flex under the pressure of said rollers, the mutual spacing of said rollers and of said supports being so chosen that during operation of said assembly said rollers will be all opposite at least some of said supports at once and all opposite at least some of said unsupported portions at once, in alternation, thereby causing periodic alternate flexing and recovery of said unsupported portions of said layer and corresponding vibration of the movable member toward and away from the other member at a frequency determined by the peripheral speed of said rollers and the mutual spacing of said supports.

2. In a sonic generator a roller bearing assembly for producing vibrations, which comprises a pair of spaced coaxial members so mounted that one is rotatable relative to the other, said members having mutually facing portions having plain bearing surfaces which define a circular path therebetween, a row of regularly spaced rollers held between said members in said path for rolling on said surfaces actuated by the relative movement of said members, one of said members comprising a thin resilient shim, means for yieldingly pressing at least one of said members toward the other member for exerting pressure on said rollers between said surfaces and at least one of said members being mounted in said assembly so as to have at least portions thereof movable toward and away from the other member, and means providing a series of supports immediately adjacent said shim opposite its bearing surface for inflexibly supporting the same only at regularly spaced intervals so that the unsupported portions of said shim will flex under the pressure of said rollers, the mutual spacing of said rollers and of said supports being so chosen that during operation of said assembly said rollers will be all opposite at least some of said supports at once and all opposite at least some of said unsupported portions at once, in alternation, thereby causing periodic alternate flexing and recovery of said unsupported portions of said shim and corresponding vibration of the movable member toward and away from the other member at a frequency determined by the peripheral speed of said rollers and the mutual spacing of said supports.

3. In a sonic generator a roller bearing assembly for producing vibrations, which comprises a pair of spaced coaxial members so mounted that one is rotatable relative to the other, said members having portions providing mutually facing plain bearing surfaces which define a circular path therebetween, two rows of regularly spaced rollers and a thin resilient shim held between said members and in said path, said rows of rollers being separated from each other by said shim and one row of rollers engaging each bearing surface for rolling thereon actuated by the relative movement of said members, and means for yieldingly pressing at least one of said members toward the other member for exerting pressure on said rollers between said surfaces and at least one of said members being mounted in said assembly so as to be movable toward and away from the other member, the size and mutual spacing of the rollers of each row being so chosen that during operation of said assembly the rollers of one row will be all opposite at least some of the rollers of the other row at once and all opposite at least some of the intervals between rollers of said other row at once, in alternation, thereby causing periodic alternate flexing and recovery of the portions of said shim opposite said intervals and corresponding vibration of said movable member toward and away from the other member at a frequency determined by the mutual spacing and relative peripheral speed of said rollers.

4. In a sonic generator a roller bearing assembly for producing vibrations, which comprises a pair of spaced coaxial members so mounted that one is rotatably stationary and the other is rotatable relative thereto, said members having portions providing mutually facing plain bearing surfaces which define a circular path therebetween, two rows of regularly spaced rollers and a thin resilient shim held between said members and in said path, said rows of rollers being separated from each other by said shim and one row of rollers engaging each bearing surface for rolling thereon actuated by the movement of said rotatable member, means for yieldingly pressing said rotatably stationary member toward the other member for exerting pressure on said rollers between said surfaces and permitting limited movement thereof toward and away from the other member, the size and mutual spacing of the rollers of each row being so chosen that during operation of said assembly the rollers of one row will be all opposite at least some of the rollers of the other row at once and all opposite at least some of the intervals between rollers of said other row at once, in alternation, thereby causing periodic alternate flexing and recovery of the portions of said shim opposite said intervals and corresponding vibration of said rotatably stationary member toward and away from the other member at a frequency determined by the mutual spacing and relative peripheral speed of said rollers.

5. In a sonic generator a roller bearing assembly for producing vibrations, which comprises a pair of spaced coaxial members so mounted that one is rotatable relative to the other, said members having portions providing mutually facing surfaces one of which constitutes a plain bearing surface, said surfaces defining a circular path therebetween, a row of regularly spaced rollers and a thin resilient shim held between said members and in said path, said rollers rolling on said bearing surface and on one side of said shim actuated by the relative movement of said members and being separated from said other surface by said shim, and means for yieldingly pressing at least one of said members toward the other member for exerting pressure on said rollers and shim between said surfaces and at least one of said members being mounted in said assembly so as to be movable toward and away from the other member, the one of said surfaces adjacent said shim being provided with a series of regularly spaced grooves so that the portions of said shim opposite said grooves will flex under the pressure of said rollers, the size and mutual spacing of said rollers and of said grooves being so chosen that during operation of said assembly said rollers will be all opposite at least some of said grooves at once and all opposite at least some of the intervals between said grooves at once, in alternation, thereby causing periodic alternate flexing and recovery of the portions of said shim opposite said grooves and corresponding vibration of said movable member toward and away from the other member at a frequency determined by the peripheral speed of said rollers and the mutual spacing of said grooves.

6. In a sonic generator a roller bearing assembly for producing vibrations, which comprises a pair of spaced coaxial members so mounted that one is rotatably stationary and the other is rotatable relative thereto, said members having portions providing mutually facing surfaces one of which constitutes a plain bearing surface, said surfaces defining a circular path therebetween, a row of regularly spaced rollers and a thin resilient shim held between said members and in said path, said rollers rolling on said bearing surface and on one side of said shim actuated by the movement of said rotatable member and being separated from said other surface by said shim, and means for yieldingly pressing said rotatably stationary member toward the other member for exerting pressure on said rollers and shim between said surfaces and permitting limited movement thereof toward and away from said other member, the one of said surfaces adjacent said shim being provided with a series of regularly spaced grooves so that the portions of said shim opposite said grooves will flex under the pressure of said rollers, the size and mutual spacing of said rollers and of said grooves being so chosen that during operation of said assembly said rollers will be all opposite at least some of said grooves at once and all opposite at least some of the intervals between said grooves at once, in alternation, thereby causing periodic alternate flexing and recovery of the portions of said shim opposite said grooves and corresponding vibration of said rotatably stationary member toward and away from said rotatable member at a frequency determined by the peripheral speed of said rollers and the mutual spacing of said grooves.

7. In a sonic generator a roller bearing assembly for producing vibrations, which comprises a pair of spaced coaxial members so mounted that one is rotatable relative to the other, said members having portions providing mutually facing plain bearing surfaces which define a circular path therebetween, at least one of said members being mounted in said assembly so as to be movable toward and away from the other member, a row of regularly spaced rollers held between said members in said path for rolling on said surfaces actuated by the relative movement of said members, and means for yieldingly pressing at least one of said members toward the other member for exerting pressure on said rollers between said surfaces, at least one of said portions being composed at least in part of a layer of resilient material a surface of which constitutes one of said bearing surfaces and having a series of regularly spaced cavities immediately beneath said layer so that the portions of said layer opposite said cavities will flex under the pressure of said rollers, the size and mutual spacing of said rollers and of said cavities being so chosen that during operation of said assembly said rollers will be all opposite at least some of said cavities at once and all opposite at least some of the intervals between said cavities at once, in alternation, thereby causing periodic alternate flexing and recovery of said portions of said layer opposite said cavities and corresponding vibration of said movable member toward and away from the other member at a frequency determined by the peripheral speed of said rollers and the mutual spacing of said cavities.

8. In a sonic generator a roller bearing assembly for producing vibrations, which comprises a casing, at least two coaxial circular plate-like members axially spaced from each other mounted in said casing so that one will be rotatable relative to the other, said members having portions providing mutually facing plain bearing surfaces extending in directions transverse of the common axis and defining a circular path therebetween, at least one of said portions being composed at least in part of a layer of resilient material a surface of which constitutes one of said bearing surfaces, a row of regularly spaced rollers held between said members and in said path for rolling on said surfaces actuated by the relative movement of said members, resilient mountings holding one of said members in said casing for limited movement in an axial direction toward and away from the other member and for exerting pressure on said rollers between said bearing surfaces, and means providing a series of supports immediately adjacent said layer opposite its bearing surface for inflexibly supporting the same only at regularly spaced intervals so that the unsupported portions of said layer will flex under the pressure of said rollers, the mutual spacing of said rollers and of said supports being so chosen that during operation of said assembly said rollers will be all opposite at least some of said supports at once and all opposite at least some of said unsupported portions at once, in alternation, thereby causing periodic alternate flexing and recovery of said unsupported portions of said layer and corresponding vibration of said movable member toward and away from the other member at a frequency determined by the peripheral speed of said rollers and the mutual spacing of said supports.

9. In a sonic generator a roller bearing assembly for producing vibrations, which comprises a casing, at least two coaxial circular plate-like members axially spaced from each other mounted in said casing so that one will be rotatable relative to the other, said members having portions providing mutually facing plain bearing surfaces extending in directions transverse of the common axis and defining a circular path therebetween, a row of regularly spaced rollers held between said members in said path for rolling on said surfaces actuated by the relative movement of said members, one of said members comprising a thin resilient shim, resilient mountings holding one of said members in said casing for limited movement in an axial direction toward and away from the other member and for exerting pressure on said rollers between said surfaces, and means providing a series of supports immediately adjacent said shim opposite its bearing surface for inflexibly supporting the same only at regularly spaced intervals so that the unsupported portions of said shim will flex under the pressure of said rollers, the size and mutual spacing of said rollers being so chosen with reference to the spacing of said supports that during operation of said assembly said rollers will be all opposite at least some of said supports at once and all opposite at least some of said unsupported portions at once, in alternation, thereby causing periodic alternate flexing and recovery of said unsupported portions of said shim and corresponding vibration of said movable member toward and away from the other member at a frequency determined by the peripheral speed of said rollers and the mutual spacing of said supports.

10. In a sonic generator a roller bearing assembly for producing vibrations, which comprises a casing, at least two coaxial circular plate-like members axially spaced from each other mounted in said casing so that one will be rotatable relative to the other, said members having portions providing mutually facing plain bearing surfaces extending in directions transverse of the common axis and defining a circular path therebetween, two rows of regularly spaced rollers and a thin resilient shim held between said members and in said path, said rows of rollers being separated from each other by said shim and one row of rollers engaging each bearing surface for rolling thereon actuated by the relative movement of said members, and means for yieldingly pressing at least one of said members toward the other member while permitting limited axial movement thereof toward and away from the other member for exerting pressure on said rollers and shim between said surfaces, the size and mutual spacing of the rollers of each row being so chosen that during operation of said assembly the rollers of one row will be all opposite at least some of the rollers of the other row at once and all opposite at least some of the intervals between rollers of said other row at once, in alternation, thereby causing periodic alternate flexing and recovery of the portions of said shim opposite said intervals and corresponding vibration of said axially movable member toward and away from the other members at a frequency determined by the mutual spacing and relative peripheral speed of said rollers.

11. In a sonic generator a roller bearing assembly for producing vibrations, which comprises a casing, at least two coaxial circular plate-like members axially spaced from each other mounted in said casing so that one will be rotatable relative to the other, said members having portions providing mutually facing plain bearing surfaces extending in directions transverse of the common axis and defining a circular path therebetween, two rows of regularly spaced rollers and a thin resilient shim held between said members and in said path, said rows of rollers being separated from each other by said shim and one row of rollers engaging each bearing surface for rolling thereon actuated by the relative movement of said members, and resilient mountings holding one of said members in said casing for limited movement in an axial direction toward and away from the other of said members and for exerting pressure on said rollers and shim between said bearing surfaces, the size and mutual spacing of the rollers of each row being so chosen that during operation of said assembly the rollers of one row will be all opposite at least some of the rollers of the other row at once and all opposite at least some of the intervals between rollers of said other row at once, in alternation, thereby causing periodic alternate flexing and recovery of the portions of said shim opposite said intervals and corresponding vibration of said axially movable member toward and away from the other members at a frequency determined by the mutual spacing and relative peripheral speed of said rollers.

12. In a sonic generator a roller bearing assembly for producing vibrations, which comprises a generally cylindrical casing, a pair of coaxial circular plate-like members axially spaced from each other mounted within said casing, one of said members being rotatable and the other of said members being rotatably stationary and having a radially extending resilient flange by which it is held to said casing, said flange permitting limited vibratory movement thereof in an axial direction and urging the same toward the other member, said members having portions providing mutually facing plain bearing surfaces extending in directions transverse of the common axis and defining a circular path therebetween, and two rows of regularly spaced rollers and a thin resilient shim held under pressure between said members and in said path by the action of said flange, said rows of rollers being separated from each other by said shim and one row of rollers engaging each bearing surface for rolling thereon actuated by the movement of said rotatable member, the size and mutual spacing of the rollers of each row being so chosen that during rotation of said rotatable member the rollers of one row will be all opposite at least some of the rollers of the other row at once and all opposite at least some of the intervals between rollers of said other row at once, in alternation, thereby causing periodic alternate flexing and recovery of the portions of said shim opposite said intervals and corresponding vibration of said rotatably stationary member toward and away from the other member at a frequency determined by the mutual spacing and relative peripheral speed of said rollers, the face of said rotatably stationary member away from said rollers constituting a vibrating surface.

13. In a sonic generator a roller bearing assembly for producing vibrations, which comprises a casing, at least two coaxial circular plate-like members axially spaced from each other mounted in said casing so that one will be rotatable relative to the other, said members having portions providing mutually facing plain bearing surfaces extending in directions transverse of the common axis and defining a circular path therebetween, two rows of regularly spaced rollers and a thin resilient shim held between said members and in said path, said rows of rollers being uniformly tapered and having their smaller ends extending radially inwardly and said rows being separated from each other by said shim, one of said rows of rollers engaging each bearing surface for rolling thereon actuated by the relative movement of said members, and resilient mountings holding one of said members in said casing for limited movement in an axial direction toward and away from the other of said members and for exerting pressure on said rollers and shim between said bearing surfaces, the size and mutual spacing of the rollers of each row being so chosen that during operation of said assembly the rollers of one row will be all opposite at least some of the rollers of the other row at once and all opposite at least some of the intervals between rollers of said other row at once, in alternation, thereby causing periodic alternate flexing and recovery of the portions of said shim opposite said intervals and corresponding vibration of said axially movable member toward and away from the other member at a frequency determined by the mutual spacing and relative peripheral speed of said rollers.

14. In a sonic generator a roller bearing assembly for producing vibrations, which comprises a casing, at least two coaxial circular plate-like members axially spaced from each other mounted within said casing, one of said members being rotatable and the other of said members being rotatably stationary, said members having portions providing mutually facing plain bearing surfaces extending in directions transverse of the common axis and defining a circular path therebetween, a row of regularly spaced rollers held between said members in said path for rolling on said surfaces actuated by the rotation of said rotatable member, said rotatable member comprising a thin resilient shim, the other of said members having a radially extending resilient flange holding it in said casing for limited movement in an axial direction toward and away from said shim and for exerting pressure on said rollers and shim, and means providing a series of supports immediately adjacent said shim opposite its bearing surface for inflexibly supporting the same only at regularly spaced intervals so that the unsupported portions of said shim will flex under the pressure of said rollers, the size and mutual spacing of said rollers being so chosen with reference to the spacing of said supports that during operation of said assembly said rollers will be all opposite at least some of said supports at once and all opposite at least some of said unsupported portions at once, in alternation, thereby causing periodic alternate flexing and recovery of said unsupported portions of said shim and corresponding vibration of said axially movable member toward and away from said shim at a frequency determined by the peripheral speed of said rollers and the mutual spacing of said supports.

15. In a sonic generator a roller bearing assembly for producing vibrations, which comprises inner and outer concentric members mounted so that one will be rotatable relative to the other, said members having portions providing mutually facing plain bearing surfaces defining a circular path therebetween, a row of regularly spaced rollers held between said members and in said path for rolling on said surfaces actuated by the relative movement of said rollers, means for yieldingly pressing one of said members radially toward the other member for exerting pressure on said rollers between said bearing surfaces and permitting limited expansion and contraction of the member so pressed in a radial direction toward and away from the other member and at least one of said portions being composed at least in part of a layer of resilient material a surface of which constitutes one of said bearing surfaces, and means providing a series of supports immediately adjacent said layer opposite its bearing surface for inflexibly supporting the same only at regularly spaced intervals so that the unsupported portions of said layer will flex under the pressure of said rollers, the size and mutual spacing of said rollers and of said supports being so chosen that during operation of said assembly said rollers will be all opposite at least some of said supports at once and all opposite at least some of said unsupported portions at once, in alternation, thereby causing periodic alternate flexing and recovery of said unsupported portions of said layer and corresponding vibratory radial contraction and expansion of said radially pressed member toward and away from the other member at a frequency determined by the peripheral speed of said rollers and the mutual spacing of said supports.

16. In a sonic generator a roller bearing assembly for producing vibrations, which comprises inner and outer concentric members mounted so that one will be rotatable relative to the other, said members having portions providing mutually facing plain bearing surfaces which define a circular path therebetween, a row of regularly spaced rollers held between said members and in said path for rolling on said surfaces actuated by the relative movement of said rollers, one of said members comprising a thin resilient shim, means for yieldingly pressing one of said members radially toward the other member for exerting pressure on said rollers between said bearing surfaces and permitting limited expansion and contraction thereof in a radial direction toward and away from said other member, and means providing a series of supports immediately adjacent said shim opposite its bearing surface for inflexibly supporting the same only at regularly spaced intervals so that the unsupported portions of said shim will flex under the pressure of said rollers, the size and mutual spacing of said rollers and of said supports being so chosen that during operation of said assembly said rollers will be all opposite at least some of said supports at once and all opposite at least some of said unsupported portions at once, in alternation, thereby causing periodic alternate flexing and recovery of said unsupported portions of said shim and corresponding vibratory radial contraction and expansion of said radially pressed member toward and away from the other member at a frequency determined by the peripheral speed of said rollers and the mutual spacing of said supports.

17. In a sonic generator a roller bearing assembly for producing vibrations, which comprises inner and outer concentric members so mounted that one will be rotatable relative to the other, said members having portions providing mutually facing bearing surfaces which define a circular path therebetween, and two rows of regularly spaced rollers and a thin resilient shim held between said members and in said path, said rows of rollers being separated from each other by said shim and one row of rollers engaging each bearing surface for rolling thereon actuated by the relative movement of said members, one of said members being resilient for limited expansion and contraction in a radial direction toward and away from the other member and for exerting pressure on said rollers and shim between said bearing surfaces, the size and mutual spacing of the rollers of each row being so chosen that during operation of said assembly the rollers of one row will be all opposite at least some of the rollers of the other row at once and all opposite at least some of the intervals between rollers of said other row at once, in alternation, thereby causing periodic alternate flexing and recovery of the portions of said shim opposite said intervals and corresponding vibratory radial contraction and expansion of said resilient member toward and away from the other member at a frequency determined by the mutual spacing and relative peripheral speed of said rollers.

18. In a sonic generator a roller bearing assembly for producing vibrations, which comprises inner and outer concentric members so mounted that one will be rotatable relative to the other, said members having portions providing mutually facing plain generally cylindrical bearing surfaces which define a circular path therebetween, and two rows of regularly spaced rollers and a thin resilient generally cylindrical shim held between said members and in said path, said rows of rollers being separated from each other by said shim and one row of rollers engaging each bearing surface for rolling thereon actuated by the rotation of said rotatable member, said outer member being resilient for limited expansion and contraction in a radial direction toward and away from the inner member and for exerting pressure on said rollers and shim between said bearing surfaces, the size and mutual spacing of the rollers of each row being so chosen that during operation of said assembly the rollers of one row will be all opposite at least some of the rollers of the other row at once and all opposite at least some of the intervals between rollers of said other row at once, in alternation, thereby causing periodic alternate flexing and recovery of the portions of said shim opposite said intervals and corresponding vibratory radial contraction and expansion of said outer member toward and away from said inner member at/a frequency determined by the mutual spacing and relative peripheral speed of said rollers.

19. In a sonic generator a roller bearing assembly for producing vibrations, which comprises inner and outer concentric members the former being rotatably mounted within the latter, said members having portions providing mutually facing plain generally cylindrical bearing surfaces which define a circular path therebetween, and two rows of uniform rollers and a thin resilient generally cylindrical shim held between said members and in said path, said rows of rollers being separated from each other by said shim and one row of rollers engaging each bearing surface for rolling thereon actuated by the rotation of said inner member, said outer member being resilient and shrunk upon said inner member for limited expansion and contraction in a radial direction toward and away therefrom and for exerting pressure on said rollers and shim between said bearing surfaces, the size and mutual spacing of the rollers of each row being so chosen that during operation of said assembly the rollers of one row will be all opposite at least some of the rollers of the other row at once and all opposite at least some of the intervals between rollers of said other row at once, in alternation, thereby causing periodic alternate flexing and recovery of the portions of said shim opposite said intervals and corresponding vibratory radial contraction and expansion of said outer member toward and away from said inner member at a frequency determined by the mutual spacing and relative peripheral speed of said rollers.

GORDON C. SEAVEY.
CAPERTON B. HORSLEY.

REFERENCES CITED

The following references are of record in the file of this patent:

UNITED STATES PATENTS

| Number | Name | Date |
| --- | --- | --- |
| 1,102,619 | Weinberg | July 7, 1914 |

(Other references on following page)

UNITED STATES PATENTS

| Number | Name | Date |
|---|---|---|
| 1,120,653 | Russell | Dec. 8, 1914 |
| 1,125,083 | Fitzgerald | Jan. 19, 1915 |
| 1,139,233 | Scognamillo | May 11, 1915 |
| 1,148,294 | Dean | July 27, 1915 |
| 1,189,795 | Dean | July 4, 1916 |
| 1,441,402 | Conlombe | Jan. 9, 1923 |
| 2,163,649 | Weaver | June 27, 1939 |
| 2,170,178 | Williams | Aug. 22, 1939 |
| 2,258,630 | Smith | Oct. 14, 1941 |

FOREIGN PATENTS

| Number | Country | Date |
|---|---|---|
| 349,519 | Germany | Mar. 3, 1922 |
| 452,715 | France | May 22, 1913 |